United States Patent [19]

Lin

[11] Patent Number: 5,895,742

[45] Date of Patent: Apr. 20, 1999

[54] VELOCITY-MATCHED TRAVELING-WAVE ELECTRO-OPTICAL MODULATOR USING A BENZOCYCLOBUTENE BUFFER LAYER

[75] Inventor: Jack Lin, West Hartford, Conn.

[73] Assignee: Uniphase Telecommunications Products, Inc., San Jose, Calif.

[21] Appl. No.: 08/683,870

[22] Filed: Jul. 19, 1996

[51] Int. Cl.⁶ .................. G03C 5/00; G02F 1/035
[52] U.S. Cl. .................. 430/321; 430/317; 385/2; 385/14
[58] Field of Search .................. 430/321, 317; 385/14, 2

[56] References Cited

U.S. PATENT DOCUMENTS

| | | | |
|---|---|---|---|
| 4,437,961 | 3/1984 | Routh et al. | 204/192 EC |
| 5,303,079 | 4/1994 | Gnauck et al. | 359/188 |
| 5,414,791 | 5/1995 | Ermer et al. | 385/143 |
| 5,455,876 | 10/1995 | Hopfer et al. | 385/2 |

OTHER PUBLICATIONS

"Dispersion Penalty Reduction Using an Optical Modulator with Adjustable Chirp", by A.H. Gnauck, S.K. Korotky, J.J. Veselka, J. Nagel, C.T. Kemmerer, W.J. Minford and D.T. Moser; IEEE Photonics Technology Letters, vol. 3, No. 10, Oct. 1991.

Primary Examiner—Janet C. Baxter
Assistant Examiner—Rosemary Ashton
Attorney, Agent, or Firm—McCormick, Paulding & Huber

[57] ABSTRACT

A method for use in fabricating an electro-optic structure on a substrate having an optical waveguide formed in an upper surface thereof, comprises the steps of forming a layer of organic dielectric material, such as a benzocyclobutene (BCB) resin, on the substrate upper surface, forming an interface layer on an upper surface of the organic dielectric layer, and forming an electrically isolated electrode on an upper surface of the interface layer such that an electrical field can be induced in the optical waveguide.

5 Claims, 5 Drawing Sheets

VELOCITY-MATCHED TRAVELING-WAVE ELECTRO-OPTICAL MODULATOR USING A BENZOCYCLOBUTENE BUFFER LAYER

FIELD OF THE INVENTION

The present invention relates to optical devices and, more specifically, to optical devices which are manufactured with benzocyclobutene.

BACKGROUND OF THE INVENTION

Known fiber optic communications systems include a laser diode, a modulator and a photodetector diode. Modulators are either direct, modulating the optical wave as it is generated at the source, or external, modulating the optical wave after it has been generated. A problem with fiber optic communications systems is that the dynamic range of the system is largely determined by distortion from the modulator. External modulation of lightwave signals is controlled by adjusting a modulation chirp parameter to a substantially fixed value in a predetermined, controllable manner. This minimizes the transmission power penalty caused by chromatic dispersion in an optical fiber communication system.

External modulation is accomplished, for example, in a dual waveguide device wherein substantially identical input optical beams are supplied to the waveguides and wherein each waveguide is subject to its own individual, mutually exclusive control. Modulation signals are applied to each waveguide via the separate control. Moreover, control signals are applied to each waveguide for adjusting the modulation chirp parameter to a desired non-zero substantially fixed value.

An electro-optical modulator modulates the optical signal with an electromagnetic signal, preferably an RF signal. The RF signal interacts with the optical signal over a predetermined distance. The construction of optical modulators slows the RF signal relative to the optical signal so that it takes the RF signal a longer period of time to travel the interaction distance. Therefore, the RF signal electric field, which modulates the optical signal, varies along the interaction distance. Since the RF signal does not act on the same portion of the optical signal throughout the interaction distance, the optical signal is distorted. The longer the interaction distance, the greater the distortion.

Typical high-speed electro-optical external modulators use a travelingwave electrode structure. Such modulators have a microwave transmission line in the vicinity of the optical waveguide. A microwave signal and an optical signal copropagate for a prescribed distance, thereby acquiring the required optical modulation. To prevent velocity mismatch between the microwave signal and the optical signal in a traveling wave modulator, a thick buffer layer is provided on a wafer to speed up the propagation of the microwave signal. Previously, a silicon dioxide ($SiO_2$) buffer layer was created through known techniques such as E-beam, sputtering, or chemical vapor deposition (CVD). The buffer layer may be planarized throughout the wafer or may be patterned with electrode structures.

Producing a silicon dioxide buffer layer requires expensive capital equipment and very precise control of production parameters. For example, devices such as evaporators, sputtering machines, gas supply machines or CVD machines cost tens or hundreds of thousands of dollars. Furthermore, most of the time, the $SiO_2$ material has less oxygen than necessary and requires annealing to gain proper dielectric properties. During annealing, thermal expansion creates stress between the silicon dioxide layer and the optical waveguides. The waveguides can become nonuniformly distributed throughout the wafer or even disappear under this stress. Silicon dioxide is furthermore fairly porous, and absorbs a few percent moisture after a 24-hour boil. It would be advantageous to provide a method of manufacturing optical devices which was less expensive, less complex and yielded higher quality optical devices.

Benzocyclobutene (BCB) is a new class of organic dielectric materials commonly used in multichip module (MCM) technology. As a result of its common use in MCM applications, BCB is a well-known and well-understood material. BCB exhibits several advantages over materials, such as $SiO_2$, which are conventionally used in integrated optical devices. BCB has lower dielectric loss and a lower dielectric constant, is subject to lower mechanical stress and is much easier to process during production of integrated optical modulators. The ease with which BCB buffer layers are constructed provides a significant advantage over conventional buffer materials. A liquid BCB solution is applied to a wafer cured in a nitrogen atmosphere and patterned with a photoresist or metal mask. No expensive machines, such as CVD machines, are required.

Unfortunately, interface adhesion forces between BCB and thin metal film is poor, resulting in a weak bond between a BCB layer and a metal film layer in an optical device. Furthermore, a velocity matched modulator requires an extremely thin layer of BCB, substantially less than 8000 angstroms, the minimum thickness possible in the BCB 3022 product line. It would be advantageous to provide a method of manufacturing optical devices which use BCB as a buffer layer.

SUMMARY OF THE INVENTION

An object of the present invention is to provide a method of manufacturing optical devices which is less expensive, less complex and yields higher quality optical devices.

Another object of the present invention is to provide a process for manufacturing optical devices which use BCB as a buffer layer.

According to the present invention, a method for use in fabricating an electro-optic structure on a substrate having an optical waveguide formed in an upper surface thereof, comprises the steps of forming a layer of organic dielectric material on the substrate upper surface, forming an interface layer on an upper surface of the organic dielectric layer, and forming an electrically isolated electrode on an upper surface of the interface layer such that an electrical field can be induced in the optical waveguide.

According to another aspect of the present invention, an electro-optic device is fabricated on a substrate in accordance with a method comprising the steps of forming an optical waveguide in an upper surface of the substrate, forming a layer of organic dielectric material on the substrate upper surface, forming an interface layer on an upper surface of the organic dielectric layer, and forming an electrically isolated electrode on an upper surface of the interface layer such that an electrical field can be induced in the optical waveguide.

DESCRIPTION OF PREFERRED EMBODIMENT

Figure 1:
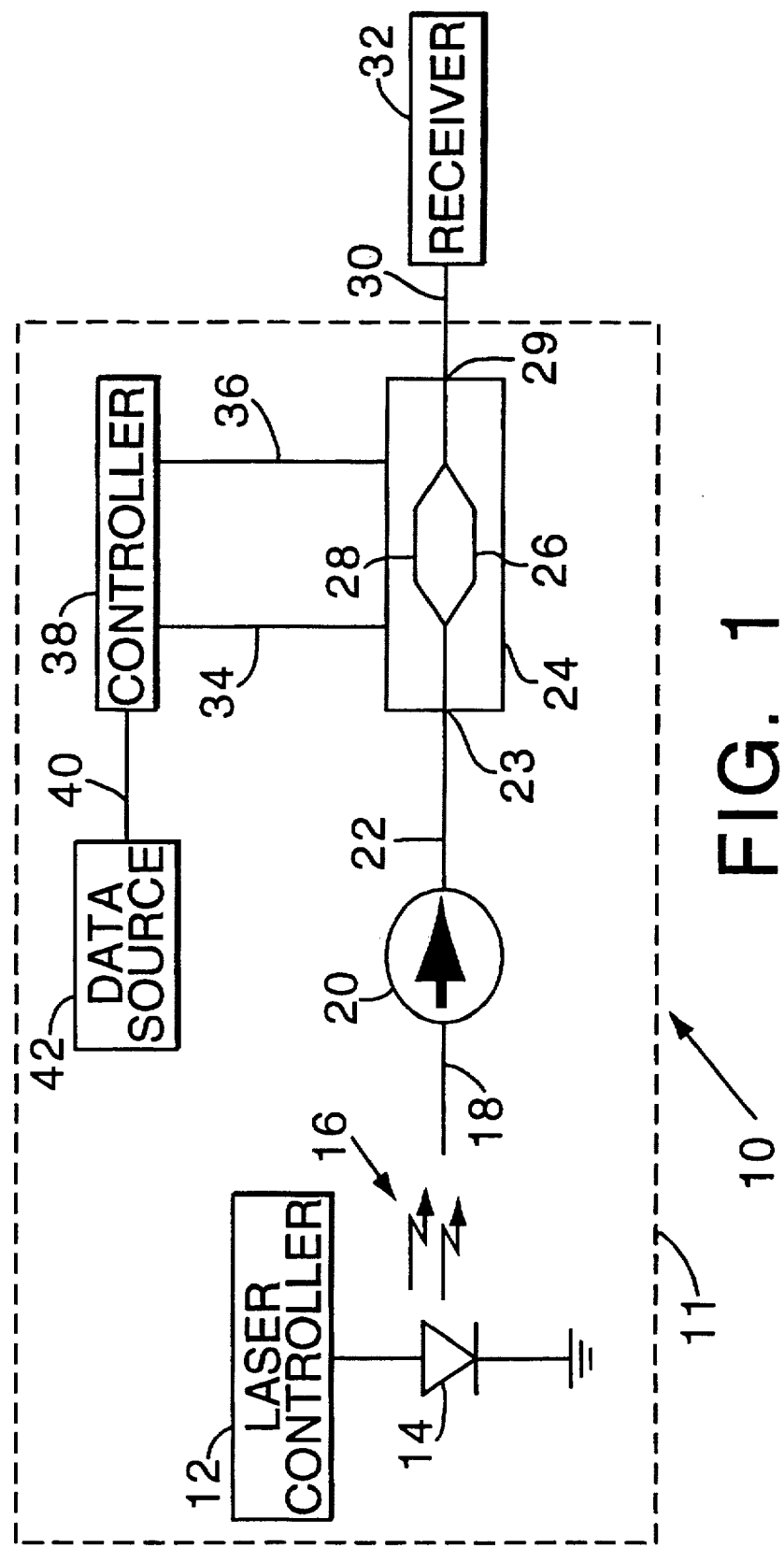
FIG. 1 is a simplified schematic diagram of an optical communication system.

FIG. 1 shows a simplified optical communication system 10 utilizing a modulator 24 which is provided in accordance with the present invention. The optical communication system 10 comprises a transmitter 11, a receiver 32 and a transmission medium 30 which connects the transmitter 11 to the receiver 32. The transmitter 11 includes a laser 14 which operates in accordance with laser control signals received from a laser controller 12, a lensed optical fiber 18, an isolator 20, an external modulator 24, a controller 38 and a data source 42. The transmission medium 30 is typically an optical fiber. The laser 14, which may operate in continuous wave (CW) mode or pulsed mode, produces optical signals 16 having a prescribed wavelength. In long wavelength communications systems, the laser 14 is typically an InGaAsP/InP semiconductor single-mode laser which generates 1.5 micrometer wavelength optical signals. The optical signals 16 are received by the lensed optical fiber 18, also known as a fiber pigtail. The lensed optical fiber 16 is coupled to the isolator 20, which reduces reflections directed towards the laser 14 from the modulator 24. In another embodiment, the isolator 20 is combined with a polarizer (not shown) to further reduce reflections towards the laser 14. In still another embodiment, the lensed optical fiber 18 is coupled directly to the modulator 24, rather than through the isolator 20.

The external modulator 24 receives the optical signals 16 from the laser 14 via an input fiber 22. The modulator 24 includes two waveguides 28 and 26, each of which the controller 38 controls independent of the other. The optical signals 16 are received and modulated by each of the waveguides 28 and 26 at an input 23 of the modulator 24. Modulated optical signals from each of the waveguides 28 and 26 are combined into combined, modulated optical signals at an output 29 of the modulator 24. The modulator 24 may perform either amplitude modulation or intensity modulation of the received optical signals 16. The combined, modulated optical signals are transmitted across the fiber 30 to the receiver 32.

The controller 38 receives digital data signals from the data source 42 via a wire 40, and generates in dependence thereon modulation control signals which are output to the modulator 24 via leads 34 and 36. The modulation control signals are indicative of a prescribed modulation of the optical signals 16 and further indicative of desired modulation chirp parameters. For example, the modulation control signals are received by the modulator 24, and in response the relative propagation velocities of each of the waveguides 28 and 26 changes, thus generating a desired modulation chirp parameter value.

One known modulator design is the Mach-Zehnder configuration. The operation of Mach-Zehnder modulators is described in detail in U.S. Pat. No. 5,455,876, incorporated herein by reference. A Mach-Zehnder modulator uses an interferometric technique in order to amplitude modulate the optical wave. A Mach-Zehnder modulator splits an incoming optical signal into two paths along optical waveguides and utilizes an electromagnetic signal, preferably a radio frequency (RF) signal, to modulate the split optical signals which are in one or both optical waveguides. The two split optical signals are then combined into a single optical signal. Although the techniques described herein can be applied to any optical modulator using RF signals, reference is made to the Mach-Zehnder modulator design as an example.

Figure 2:
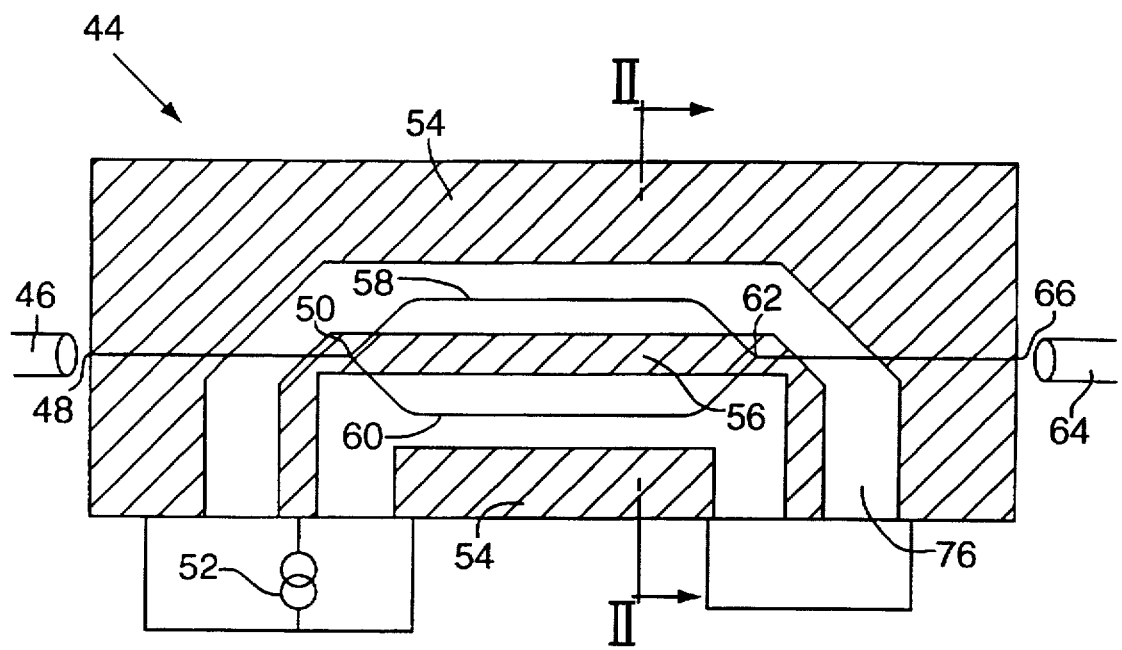
FIG. 2 is a top planar view of a modulator of the optical communication system of FIG. 1.

As seen in FIG. 2, a fiber optic cable 46 is in optical communication with an optical input 48 of a Mach-Zehnder modulator 44. The fiber optic cable 46 presents an optical signal from a light source or laser (not shown) to the input 48. The optical signal is split into two equal signals by a Y-connection 50. RF electrodes 54 and 56 conduct RF signals supplied by a signal generator 52. While the split optical signals travel down waveguides 58 and 60, the electrical field of the RF signal modulates the split optical signals. The distance in which the RF signals interact with, or modulate, the split optical signals is known as the interaction distance, and is determined primarily by the modulator design and the power of the RF signals. A second Y-connection 62 combines the two split optical signals into a single, amplitude modulated optical signal. A fiber optic cable 64 which is connected to an optical output 66 of the modulator 44, presents the combined optical signal to subsequent stages (not shown) of an optical communication system.

Figure 3:
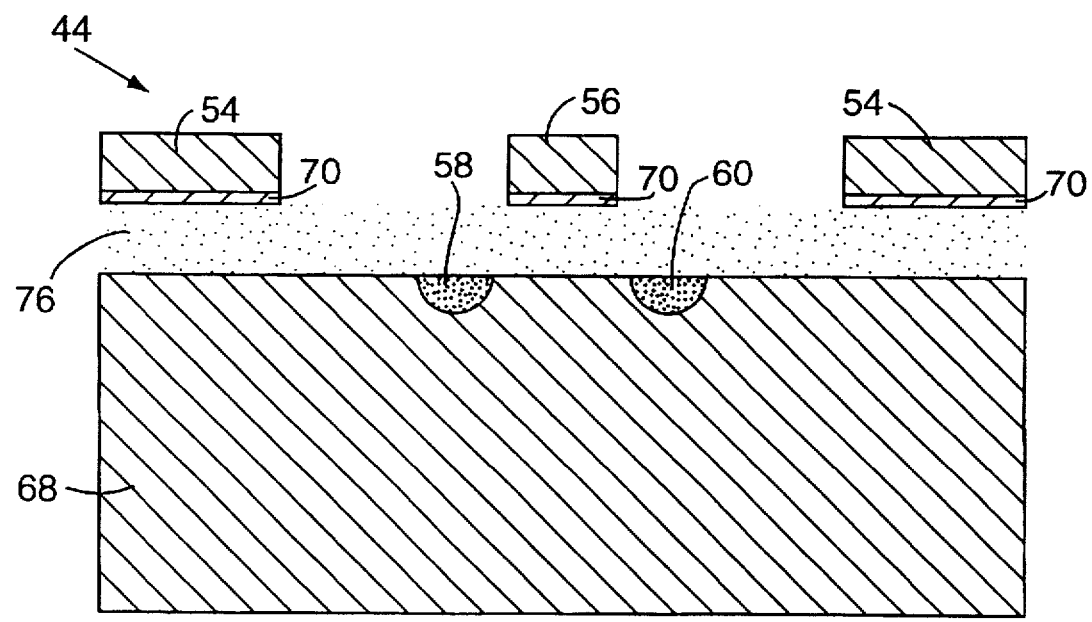
FIG. 3 is a cross sectional view taken along line II—II of FIG. 2.

Referring to FIGS. 2 and 3, the modulator 44 includes a substrate 68 which is preferably made of X-cut lithium niobate (LiNbO$_3$) and is approximately 1000 microns (μm) high. The length and width of the substrate 68 depend on the modulator design and must be sufficient to support the optical waveguides 58 and 60 and the RF electrodes 54 and 56. Other electro-optic materials can be used for the substrate 68 as well. In the preferred embodiment, the optical waveguides 58 and 60 are positioned entirely within the substrate 68. The waveguides 58 and 60 are typically created by diffusing titanium into the substrate 68. In practice, a strip or channel (not shown) is formed in the substrate 68, titanium is inserted in the channel and the temperature of the substrate 68 is raised so that the titanium diffuses into the substrate 68, thereby forming the waveguides 58 and 60. The waveguides 58 and 60 are approximately seven (7) microns wide and approximately three (3) microns deep.

The RF power electrodes 54 and 56 are preferably made from gold but can be composed of any conductive metal or metal alloy, such as silver or copper. The RF electrodes 54 and 56 are formed using any of a number of known methods of adhering metal to substrate materials. The preferred method is to deposit gold using electroplating or sputtering techniques. A fifty (50) to eighty (80) angstrom sublayer 70 of titanium is preferably deposited to improve the adhesion of the gold to the substrate 68.

The RF electrodes 54 and 56 are connected to an RF transmission line which delivers RF power from the signal generator 52. A common type of transmission line is a coaxial cable. The center RF electrode 56 is connected to the center conductor of the coaxial cable which originates from the signal generator 52. The shield or outer conductor of the coaxial cable is electrically connected to electrodes 54. In typical Mach-Zehnder modulators, the thickness and width of the RF electrodes 54 and 56 are determined by the design of the modulator.

A dielectric buffer layer 76 is situated between the RF electrodes 54 and 56 and the substrate 68. The dielectric buffer layer 76 has a dielectric constant $\epsilon$. The substrate 68 has a dielectric constant which is lower than the dielectric constant $\epsilon$ of the buffer layer 76. RF electrodes 54 and 56 are electroplated over the dielectric buffer layer 76. The buffer layer 76 creates a medium for the RF signals that has the same effective dielectric constant as the medium in which the optical signals travel. Thus, the velocity of the RF signals increases since the effective dielectric constant has been lowered, and the velocity of the RF signals match the velocity of the optical signals.

In a modulator provided in accordance with the present invention, the buffer layer 76 is a layer of Benzocyclobutene (BCB) 3022. BCB 3022 is a polymer made by the Dow Chemical Company, and is widely used in multichip module (MCM) technology. BCB has better thermal and electrical characteristics than conventionally used dielectric layer materials such as silicon dioxide ($SiO_2$). The microwave dielectric constant of BCB is only 2.7, while that of $SiO_2$ is 3.9. Furthermore, BCB is hydrophobic, absorbing less than 0.25% moisture after a 24-hour boil, while porous $SiO_2$ absorbs a few percent moisture after a 24-hour boil. To use BCB in constructing modulators requires only the small capital investment of a spinner and an oven.

Unfortunately, BCB cannot be used exactly as other conventional materials are used in electro-optical modulators. The BCB film must be thinner than the thinnest layer achievable through conventional technology. Accordingly, a process which creates an adequately thin BCB film in a predictable and reproducible manner is described hereinbelow.

Figure 4:
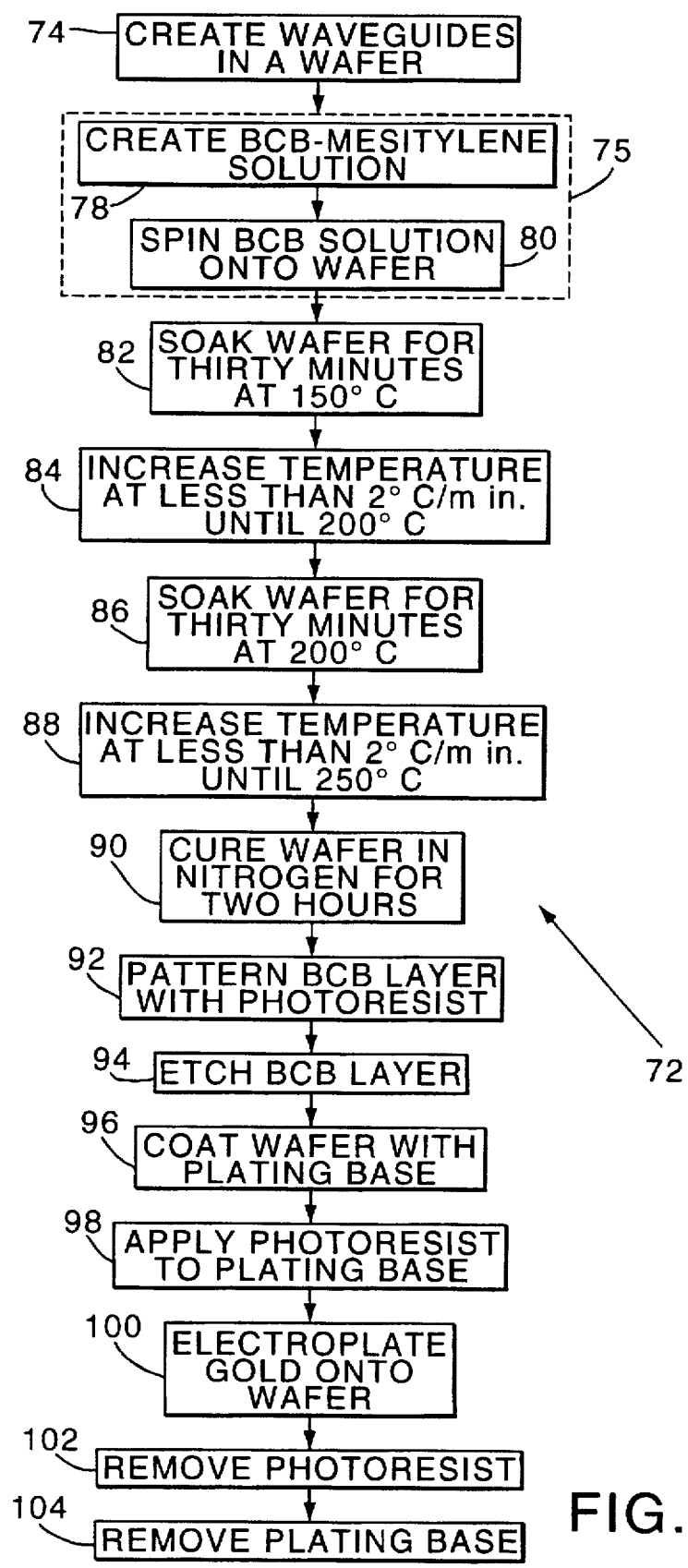
FIG. 4 is a flow chart illustrating a process for creating an optical device which uses BCB as a buffer layer in accordance with the present invention.
Figure 5:
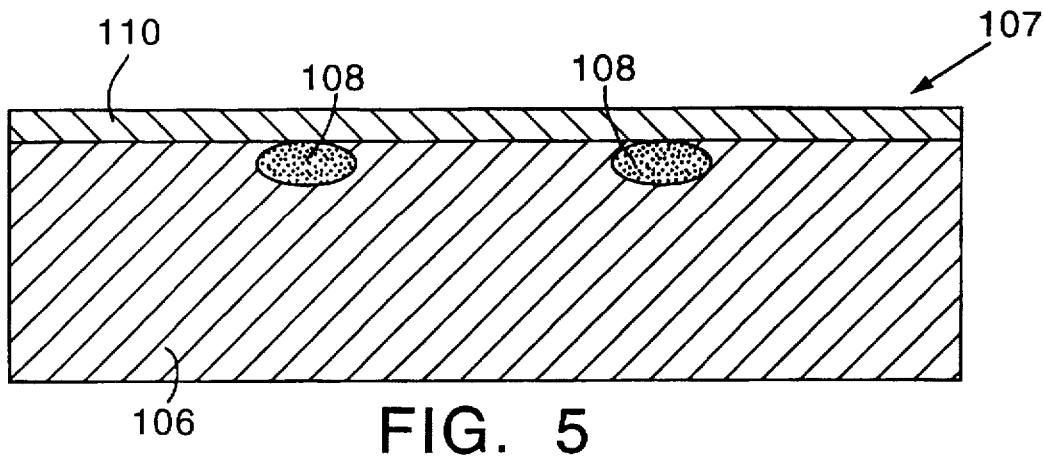
FIG. 5 is simplified sectional illustration of a substrate after initial steps of the process of FIG. 4.

FIG. 4 shows a process 72 for creating an optical device which uses BCB as a buffer layer. As shown by step 74 (FIG. 4) and also FIG. 5, optical waveguides 108 are created in substrate material 106 of a wafer 107 through known techniques such as Proton exchange or Titanium indiffusion. A BCB layer 110 is applied to the wafer 107 in a manner described hereinafter and designated by reference numeral 75 in FIG. 4. As described hereinabove, the BCB layer 110 must be extremely thin. To apply a layer of BCB to the wafer 107, the wafer 107 and BCB are placed in a spinner (not shown) and rotated at high speeds. Higher rotation speeds cause the BCB layer applied to the wafer to be thinner. Though The Dow Chemical Company recommends a maximum speed of 5000 revolutions per minute (rpm) for BCB applications, this speed does not create a sufficiently thin BCB layer, since the viscosity of BCB is too high to achieve a thickness less than 7000 Angstroms.

To overcome this deficiency, the BCB is diluted with Mesitylene solvent before spinning, as shown by step 78. The BCB particles are suspended in the solvent, and a much thinner BCB layer is possible after spinning. The solution is preferably 30% Mesitylene and 70% BCB. The wafer and BCB-Mesitylene solution are spun for 30 seconds at 5000 rpm, as shown by step 80, resulting in a 5000 angstrom BCB layer on the wafer 107.

After the BCB layer 110 is applied to the wafer 107, the wafer 107 is cured in a nitrogen atmosphere as described hereinbelow. Extra caution must be exercised when changing the temperature of a wafer composed of Lithium Niobate, since Lithium Niobate is a pyroelectric material and thermal shock can damage the wafer. Thus, following the hereinabove-described application of the BCB layer in step 75, the wafer 107 is soaked for thirty minutes at 150° Centigrade (C), as shown by step 82. Then, as shown by step 84, the temperature is increased gradually, preferably no greater than 2° C. per minute, until reaching a temperature of 200° C. Upon reaching a temperature of 200° C., the temperature is held at 200° C. for another thirty minute soak as shown by step 86. Then, the temperature increases at 2° C. per minute until reaching 250° C., as shown by step 88. The wafer is then cured at 250° Centigrade for two hours in a nitrogen atmosphere as shown by step 90.

Figure 6:
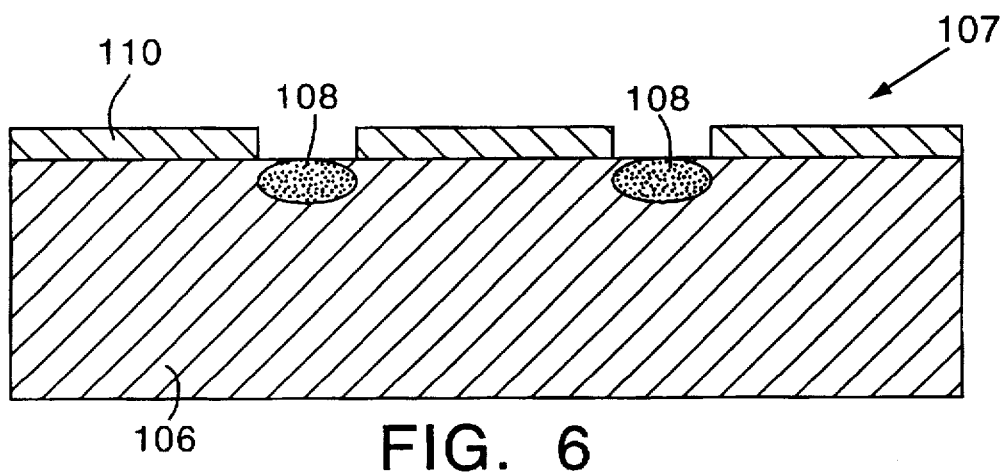
FIG. 6 is simplified sectional illustration of a substrate after an etching step of the process of FIG. 4.

As shown by step 92, the cured BCB layer 110 on the wafer 107 is patterned with a photomask to isolate the optical waveguides 108 from electrodes and also to provide higher microwave signal velocity. After patterning, the BCB is etched in a plasma parallel etcher containing a 9:1 mixture of $O_2$ and $SF_6$ in a 100 mtorr chamber, as shown by step 94. The etching rate is preferably 0.25 micrometers per minute. FIG. 6 shows the wafer 107 after etching.

Figure 7:
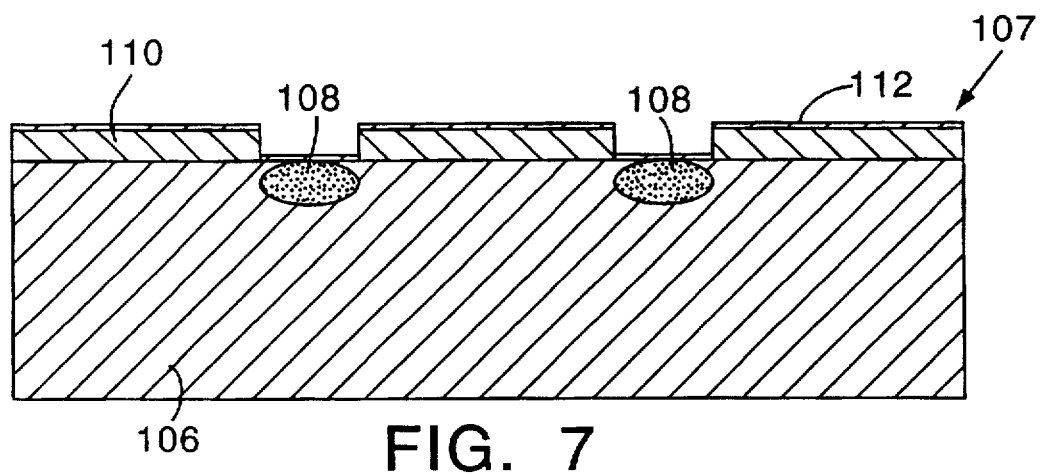
FIG. 7 is simplified sectional illustration of a substrate after a plating base is applied in accordance with the process of FIG. 4.

After etching, the wafer 107 is coated with plating base 112 for electroplating, as shown by step 96. The plating base 112 comprises a thin metal film, preferably a 200 angstrom layer of titanium/tungsten (Ti/W) and a 100 angstrom layer of gold from a sputtering system. To solve the interface adhesion problem between the BCB layer 110 and the thin metal film, the BCB layer 110 is backed with argon plasma to roughen the surface of the BCB layer. FIG. 7 shows the wafer 107 after the plating base 112 is applied thereto.

Figure 8:
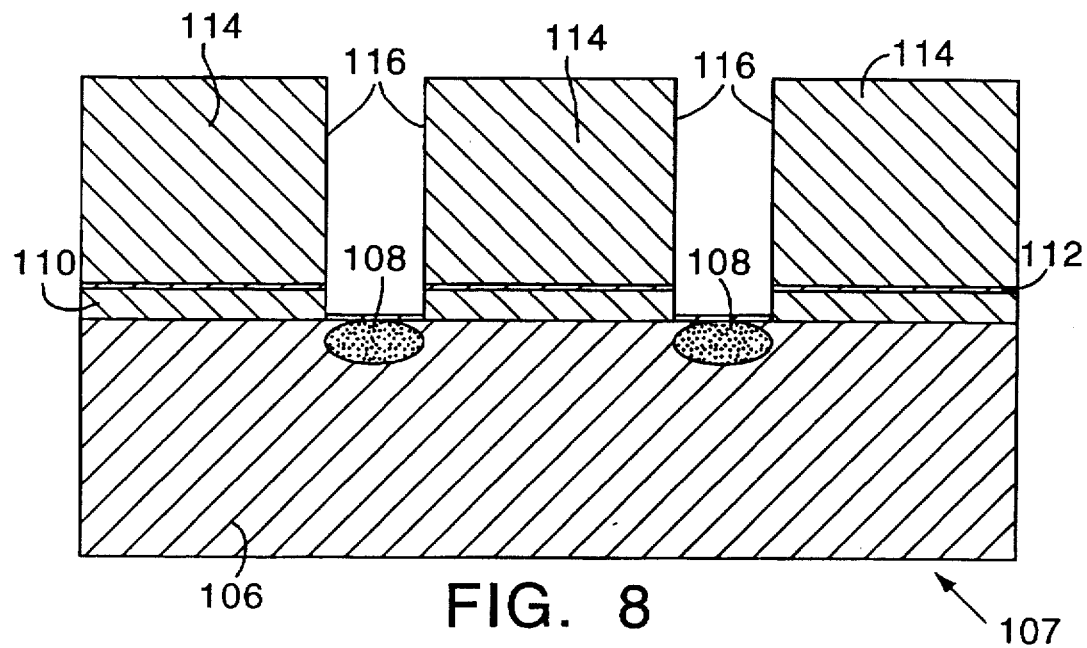
FIG. 8 is simplified sectional illustration of a substrate after a layer of gold is applied in accordance with the process of FIG. 4.
Figure 9:
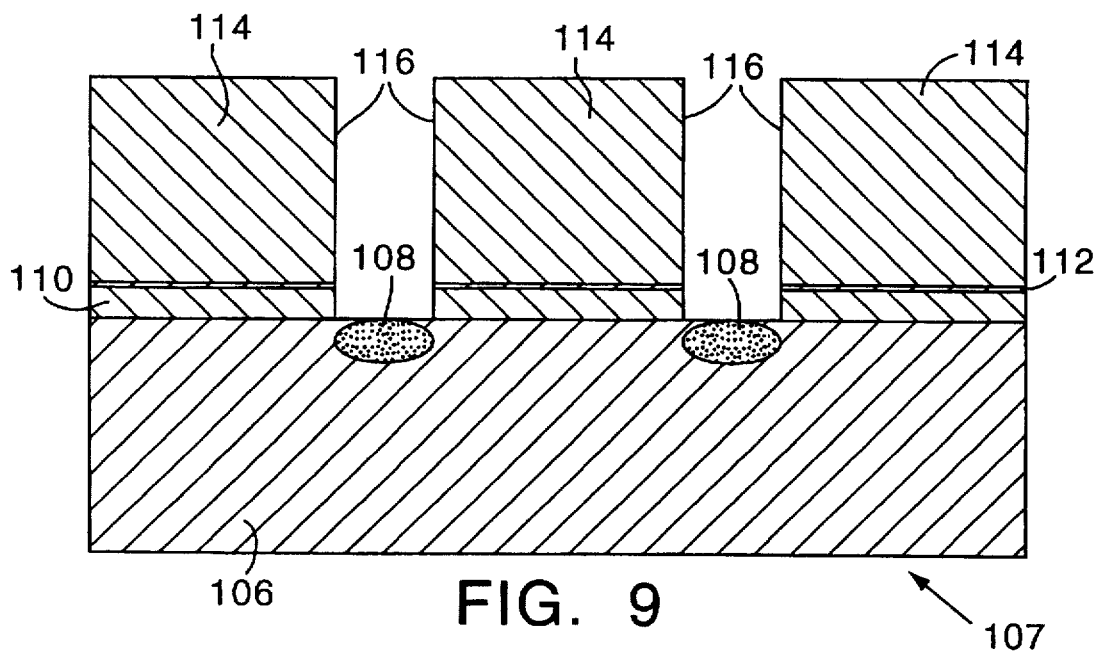
FIG. 9 is simplified sectional illustration of a substrate after a plating base is removed in accordance with the process of FIG. 4.

As shown by step 98 and with reference to FIG. 8, a thick photoresist layer, typically between 10 and 20 micrometers thick, is applied to the plating base in preparation for a step 100 of electroplating thick gold onto the wafer. The photoresist layer defines the shape of a gold layer 114 to be electroplated to the wafer 107. Accordingly, the photo process must be precise to make the etched cavity walls 116 as close to vertical as possible. The thick gold layer 114 carries a microwave signal to modulate the optical signals in the optical waveguides 108, as described hereinabove. After electroplating, the photoresist is removed, as shown by step 102, and then the plating base is removed, as shown by step 104. FIG. 9 shows the wafer 107 after the plating base plating base is removed.

Although the invention has been shown and described with respect to a preferred embodiment thereof, it would be understood by those skilled in the art that other various changes, omissions and additions thereto may be made without departing from the spirit and scope of the present invention.

What is claimed is:

1. A method of fabricating an electro-optic structure on a lithium niobate substrate having an optical waveguide formed in an upper surface thereof, said method comprising the steps of:

forming a layer of BCB organic dielectric material directly on said substrate upper surface by spinning said substrate during the application of BCB resin solution to a thickness of less than 5000A; and curing said resin and substrate in a nitrogen atmosphere at approximately 250° C.;

forming an interface layer on an upper surface of said organic dielectric layer; and forming a plurality of electrodes substantially in a plane on an upper surface of said interface layer such that an electrical field can be induced in said optical waveguide, said electrode plurality for directly receiving RF signals.

2. The method of claim 1 further comprising the steps of providing a plating base prior to the formation of said electrodes.

3. The method of claim 1 wherein said electrode forming step further comprises the steps of:

patterning said BCB layer;

etching exposed surfaces of said patterned BCB layer;

roughening the surface of said patterned BCB layer;

coating said etched BCB layer with a plating base; and electroplating a conductive material onto said plating base coated BCB material.

4. The method of claim 3 wherein said roughening step further comprises the steps of back sputtering said patterned BCB layer in an argon plasma.

5. The method of claim 1 wherein said curing step further comprises the steps of:

increasing said substrate temperature at a rate not to exceed 2 deg C. per minute;

maintaining said substrate temperature at 150 deg C. for 30 minutes; and maintaining said substrate temperature at 200 deg C. for 30 minutes.

* * * * *